US010590912B2

(12) United States Patent
Caponetti et al.

(10) Patent No.: US 10,590,912 B2
(45) Date of Patent: Mar. 17, 2020

(54) COUNTERACTING TOWER OSCILLATIONS OF AN IDLING WIND TURBINE

(71) Applicant: VESTAS WIND SYSTEMS A/S, Aarhus N (DK)

(72) Inventors: Fabio Caponetti, Aarhus C (DK); Martin Brødsgaard, Aarhus (DK); Thomas Krüger, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 700 days.

(21) Appl. No.: 15/103,126

(22) PCT Filed: Dec. 3, 2014

(86) PCT No.: PCT/DK2014/050411
§ 371 (c)(1),
(2) Date: Jun. 9, 2016

(87) PCT Pub. No.: WO2015/086023
PCT Pub. Date: Jun. 18, 2015

(65) Prior Publication Data
US 2016/0377057 A1 Dec. 29, 2016

(30) Foreign Application Priority Data
Dec. 9, 2013 (DK) .................................. 2013 70750

(51) Int. Cl.
*F03D 7/02* (2006.01)
*F03D 9/25* (2016.01)

(52) U.S. Cl.
CPC ........... *F03D 7/0224* (2013.01); *F03D 7/024* (2013.01); *F03D 7/0276* (2013.01); *F03D 7/0296* (2013.01); *F03D 9/25* (2016.05)

(58) Field of Classification Search
CPC ....... F03D 7/0296; F03D 7/0224; F03D 7/024
See application file for complete search history.

(56) References Cited

U.S. PATENT DOCUMENTS 7,279,802 B2 * 10/2007 Pasuri ....................... F03D 7/02
290/44
8,044,529 B2 * 10/2011 Egedal .................. F03D 7/0224
290/44

(Continued)

FOREIGN PATENT DOCUMENTS

CN       102454548 A    5/2012
EP         2447530 A2    5/2012

(Continued)

OTHER PUBLICATIONS

International Search Report for PCT/DK2014/050411, dated Mar. 30, 2015.

(Continued)

*Primary Examiner* — Christopher Verdier
*Assistant Examiner* — Michael L Sehn
(74) *Attorney, Agent, or Firm* — Patterson + Sheridan LLP

(57) ABSTRACT

The invention presents a method for operating a horizontal axis wind turbine, the wind turbine comprising a tower and a rotor with at least one rotor blade, the rotor being connected to the tower, and being adapted to drive a generator connected to a utility grid, wherein a pitch angle of each rotor blade is adjustable, the method comprising detecting, when the wind turbine is in an idling power producing situation in relation to the utility grid, a tower oscillation, and controlling, when the wind turbine is in the idling power producing situation, the pitch angle of the at least one rotor blade so as to produce aerodynamic forces counteracting the detected tower oscillation.

20 Claims, 5 Drawing Sheets

(56) References Cited

U.S. PATENT DOCUMENTS

| | | | |
|---|---|---|---|
| 8,057,158 B2* | 11/2011 | Seidel | F03D 7/0224 290/44 |
| 2008/0118342 A1 | 5/2008 | Seidel et al. | |
| 2011/0076142 A1* | 3/2011 | Veldkamp | F03D 7/0224 416/1 |
| 2011/0204636 A1 | 8/2011 | Scholte-Wassink et al. | |
| 2012/0104757 A1* | 5/2012 | De Las Heras Carbonell | F03D 7/0224 290/44 |
| 2013/0209254 A1 | 8/2013 | Hess et al. | |
| 2014/0356161 A1* | 12/2014 | Creaby | F03D 7/0224 416/1 |

FOREIGN PATENT DOCUMENTS

| | | |
|---|---|---|
| WO | 2008/049426 A1 | 5/2008 |
| WO | 2009068035 A2 | 6/2009 |

OTHER PUBLICATIONS

Danish Search Report for PA 2013 70750, dated Jul. 2, 2014.
Chinese Office Action for Application No. 201480072839.4 dated Jan. 30, 2018.

* cited by examiner

COUNTERACTING TOWER OSCILLATIONS OF AN IDLING WIND TURBINE

TECHNICAL FIELD

The invention relates to a method for operating a horizontal axis wind turbine, and to a wind turbine comprising a controller adapted to carry out the method.

BACKGROUND OF THE INVENTION

Idling, or an idling power producing situation, is a condition in which a wind turbine is not producing electrical power to a utility grid to which it is connected. A case in which the turbine might be idling is where the wind speed is below wind speeds in which the turbine is adapted to operate. Another case in which the turbine might be idling is where the wind speed is above wind speeds in which the turbine is adapted to operate, i.e. above a so called cut-out wind speed, which can be 25 m/s. Idling might also be caused also by faults in the system, e.g. in the turbine or in the grid, or by constraints coming from a grid operator.

A problem that can occur is tower oscillation during idling, which can be caused e.g. by high winds. Offshore, the situation can be worsened by sea waves hitting the tower bottom or the tower foundation, causing additional promotion of oscillation. The oscillation involves an oscillatory motion of the tower and nacelle, in a longitudinal (parallel with the rotor axis) and/or a transversal (lateral) direction. This can lead to fatigue damage to the wind turbine structures.

SUMMARY

It is an object of the invention to reduce damages to wind turbines during idling conditions.

This object is reached with a method for operating a horizontal axis wind turbine, the wind turbine comprising a tower and a rotor with at least one rotor blade, the rotor being connected to the tower, and being adapted to drive a generator connected to a utility grid, wherein a pitch angle of each rotor blade is adjustable, the method comprising detecting, when the wind turbine is in an idling power producing situation in relation to the utility grid, a tower oscillation, and controlling, preferably subsequently, when the wind turbine is in the idling power producing situation, the pitch angle of the at least one rotor blade so as to produce active damping with aerodynamic forces counteracting the detected tower oscillation.

The invention was conceived under the realization that normally during idling the blades are almost completely feathered out into the wind, e.g. with pitch angles of 86 degrees or above, (with reference to a zero degree reference blade position in which a reference chord of the blade is parallel to the rotor plane), and this can give a low aerodynamic damping during idling, which makes the turbine susceptible to oscillations. In view of this, the invention provides active tower damping during idling. In the active damping, the blade pitch angles are varied so as to oppose the detected tower motion. Accordingly, the pitch angles are controlled dependent on the detected tower motion, e.g. dependent on measured tower oscillations in the form of accelerations, tower deflection or tower top speed. The active damping reacts on instant changes in the detected tower motion by suitable adjustments in the blade pitch angles, i.e. adjustments which reduces tower oscillations.

In the idling condition, or the idling power producing situation, the rotor can be allowed to rotate freely, or it can be locked in a parked condition.

Preferably, the method comprises detecting that the wind turbine is in an idling power producing situation in relation to the utility grid. Alternatively, or in addition, the method can comprise controlling the wind turbine so as to be in an idling power producing situation in relation to the utility grid. Controlling the wind turbine so as to be in an idling power producing situation can comprise keeping each blade in a substantially feathered position. The feathered position mean that each blade is feathered out into the wind with a pitch angle of at least 70, preferably at least 80, more preferably at least 86 degrees with reference to a zero degree reference blade position in which a reference chord of the blade is parallel to the rotor plane.

According to an embodiment, controlling the wind turbine so as to be in an idling power producing situation comprises controlling the rotation speed of the rotor by adjusting the pitch angle of the at least one rotor blade. The control of the rotation speed may be performed as a feedback control wherein the pitch is determined as a function of the difference between a measured rotation speed and a desired rotation speed. Advantageously, the control may ensure that the rotation speed remains close to the desired rotation speed or at least within an acceptable speed range, for example within a range from 10 to 25 percent of the nominal rotation speed of the rotor.

Preferably, detecting the tower oscillation comprises detecting an acceleration of the tower, e.g. by an accelerometer mounted in the tower, or in a nacelle mounted on top of the tower.

Preferably, detecting the tower oscillation comprises detecting a longitudinal tower oscillation, and wherein controlling the pitch angle of the at least one rotor blade comprises controlling the pitch angle of the at least one rotor blade so as to produce aerodynamic forces counteracting the detected longitudinal tower oscillation. The longitudinal tower oscillation is an oscillation which is substantially parallel to the rotational axis of the rotor, and is also referred to as a fore-aft tower oscillation. Preferably, the control of the damping includes a collective pitch reference offset which is added to a static idling pitch reference value. The static idling pitch reference value is also referred to as the collective pitch reference in the description. Preferably, the offset is online calculated as function of a measured acceleration, based on which the oscillation is detected. The acceleration can be integrated to obtain the nacelle velocity and multiplied by a feedback gain, and the obtained value is used to amend the collective pitch reference.

Preferably, detecting the tower oscillation comprises detecting a lateral tower oscillation, and wherein controlling the pitch angle of the at least one rotor blade comprises controlling the pitch angle of the at least one rotor blade so as to produce aerodynamic forces counteracting the detected lateral tower oscillation. Thus, damping during idling of a lateral tower oscillation, also referred to as a side-side tower oscillation, is obtained. The aerodynamic forces include sideways forces that can be generated by individually adjusting the pitch angle. Preferably the control of this lateral damping includes adding a cyclic pitch reference offset to the static idling pitch reference value. The cyclic effect can be obtained using a function of the current position of the rotor (azimuth position), and a modulation signal can be a function of an estimated nacelle velocity. Such an estimation can be obtained by integration of a measured nacelle acceleration. The estimated velocity can be multiplied by a feedback gain to obtain the final modulation signal. Simulations show that in the case of onshore turbines, the use of the side-side tower damping in idling cases, where the mean pitch angle is set to 86 degrees can give a reduction of 10% of fatigue loading on the structure in the sideways direction.

Preferably, when controlling the pitch angle of the at least one rotor blade so as to produce aerodynamic forces counteracting the detected lateral tower oscillation, the rotor is allowed to rotate freely in the idling power producing situation.

Preferably, where the pitch angle of each rotor blade is adjustable by means of a pitch adjustment system, power to the pitch adjustment system for controlling the pitch angle is received from the utility grid. Thereby power can be obtained for the oscillation damping where the turbine is idling and power from the grid is available.

The reason for the idling can be a fault in the turbine or constraints from the grid operator, e.g. meaning that the turbine is not allowed to deliver active power to the grid. Furthermore, idling may be caused by a grid fault or by wind velocities above a rated maximum wind velocity.

Preferably, the pitch angle of each rotor blade is adjustable by means of a pitch adjustment system, and power to the pitch adjustment system for controlling the pitch angle is received from an auxiliary power source. Thereby, the damping can be obtained in situations where the grid has a failure, e.g. due to a power cable connecting the wind turbine to the grid being broken. The auxiliary power source allows operation of the pitch adjustment system. In addition to this, the auxiliary power source can allow operation of a yaw system for keeping the rotor oriented into the wind. The auxiliary power source can be dedicated only to the wind turbine, or it can be shared by a plurality of wind turbines, e.g. forming a wind farm. The auxiliary power source can be adapted for an islanded operation, where the wind turbine or the wind farm creates a small grid to self-sustain the consumption for internal equipment and active damping needs. For example, the auxiliary power source may be a generator, e.g. the main generator or an auxiliary generator, which is driven by the idling rotor.

The object is also reached with a wind turbine according to claim 12.

DESCRIPTION OF FIGURES

Below embodiments of the invention will be described with reference to the drawings, in which.

DETAILED DESCRIPTION

Figure 1:
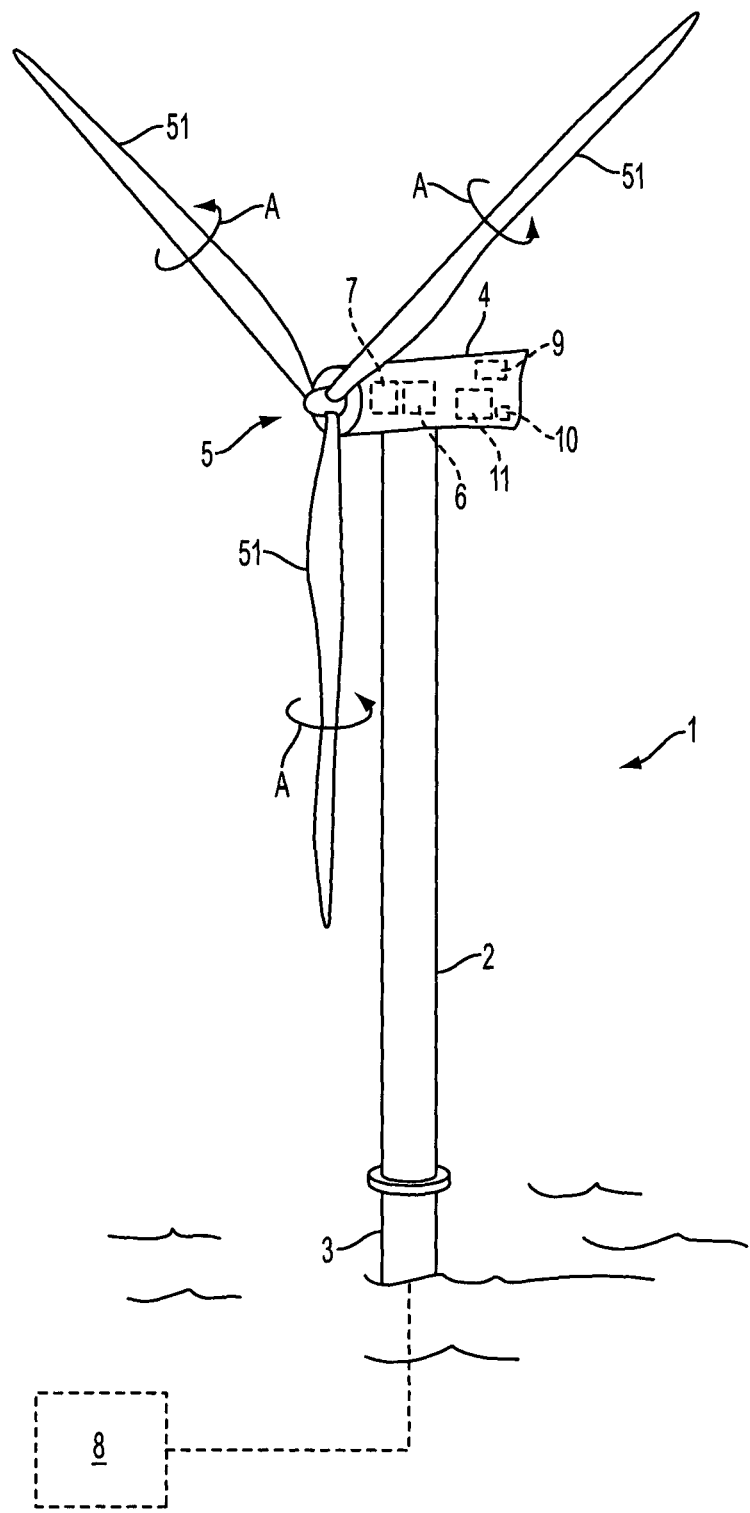
FIG. 1 shows a perspective view of an offshore wind turbine.

FIG. 1 shows an offshore horizontal axis wind turbine 1. The wind turbine comprises a tower 2 supported by an offshore foundation 3. A nacelle 4 is mounted on top of the tower 2, and can rotate in relation to the tower, by means of a yaw system, around a vertical axis. A rotor 5 is mounted on the nacelle 4, and comprises three rotor blades 51. The rotor 5 is connected to a generator 6 in the nacelle 4, via a gearbox 7, and is adapted to drive the generator 6, which in turn is connected to a utility grid 8.

A pitch angle of each rotor blade is adjustable by means of a pitch adjustment system as indicated by the arrows A. A controller 9 is adapted to control the pitch adjustment system based on input from an acceleration sensor 10 in the nacelle as described closer below.

Figure 2:
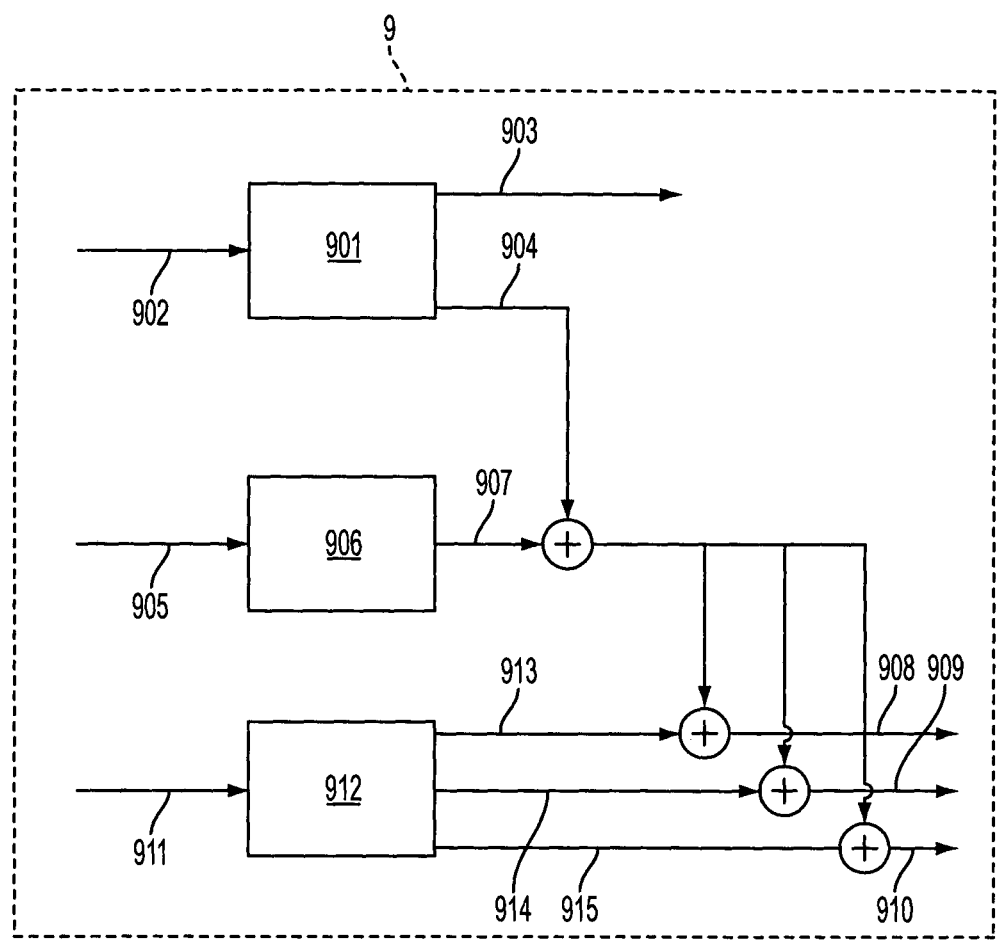
FIG. 2 shows a block diagram depicting a control algorithm for carrying out a method according to a preferred embodiment of the invention.

As can be seen in FIG. 2, the controller 9 comprises a speed control unit 901 for controlling the rotational speed of the rotor 5, based on input data 902 representing wind speed etc. The speed controller 901 is adapted to provide a generator torque reference 903 to a generator controller (not shown), and a collective pitch reference 904 to the pitch adjustment system. If the turbine is idling, the generator torque reference 903 is zero, and the collective pitch reference 904 is constant. Thus, the zero generator torque references and the constant pitch reference are used for controlling the wind turbine so as to be in an idling power producing situation in relation to the utility grid. Alternatively, or in addition, the zero generator torque references and the constant pitch reference can be used for a detection that the wind turbine is in an idling power producing situation in relation to the utility grid.

Thus, by means of the constant pitch reference the speed controller 901 is capable of maintaining a rotation speed of the rotor 5 during idling within an acceptable rotation speed range. For example, the constant pitch reference may be set to obtain a rotation speed within a range of 10-25 percent of the nominal rotation speed, i.e. the maximum rotation speed used during full load operation. When the rotation speed of the rotor is within this range, excitation of structural oscillations, e.g. tower oscillations, due to the rotation of the rotor may be avoided or reduced. At greater rotation speeds, e.g. above 30 percent of the nominal rotation speed, the rotor may excite tower oscillations.

Figure 3:
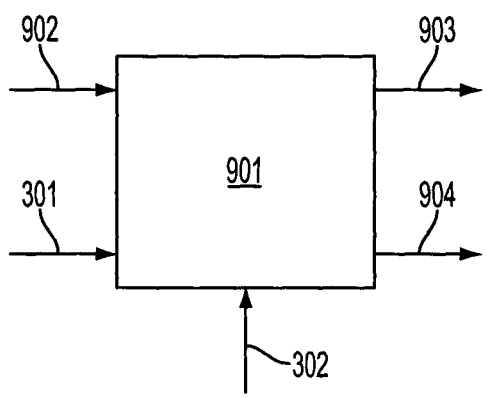
FIG. 3 shows a speed controller of the control algorithm configured as a feedback controller.

In an embodiment the speed controller 901 is configured for controlling the rotation speed of the rotor by adjusting the pitch angle of the at least one rotor blade. FIG. 3 shows an example of the speed controller 901 configured as a feedback controller, e.g. a PID controller, which determines the pitch angle of the at least one rotor blade, i.e. the collective pitch reference 904, based on a control algorithm, a received rotor speed reference 301, a measured rotor speed 302, and optionally the input data 902. Accordingly, based on difference between the rotor speed reference 301, i.e. the desired rotor speed, and the measured rotor speed, the control algorithm of the speed controller 901 determines the collective pitch reference 904 so that the difference is minimised, i.e. so that the rotor speed approaches the rotor speed reference 301.

The rotor speed reference 301 may have a value so that the rotation speed of the rotor is controlled to be within a range from 10 to 25 percent of the nominal rotation speed of the rotor. For example the rotor speed reference may be set to 15 percent of the nominal rotation speed of the rotor.

Figure 4:
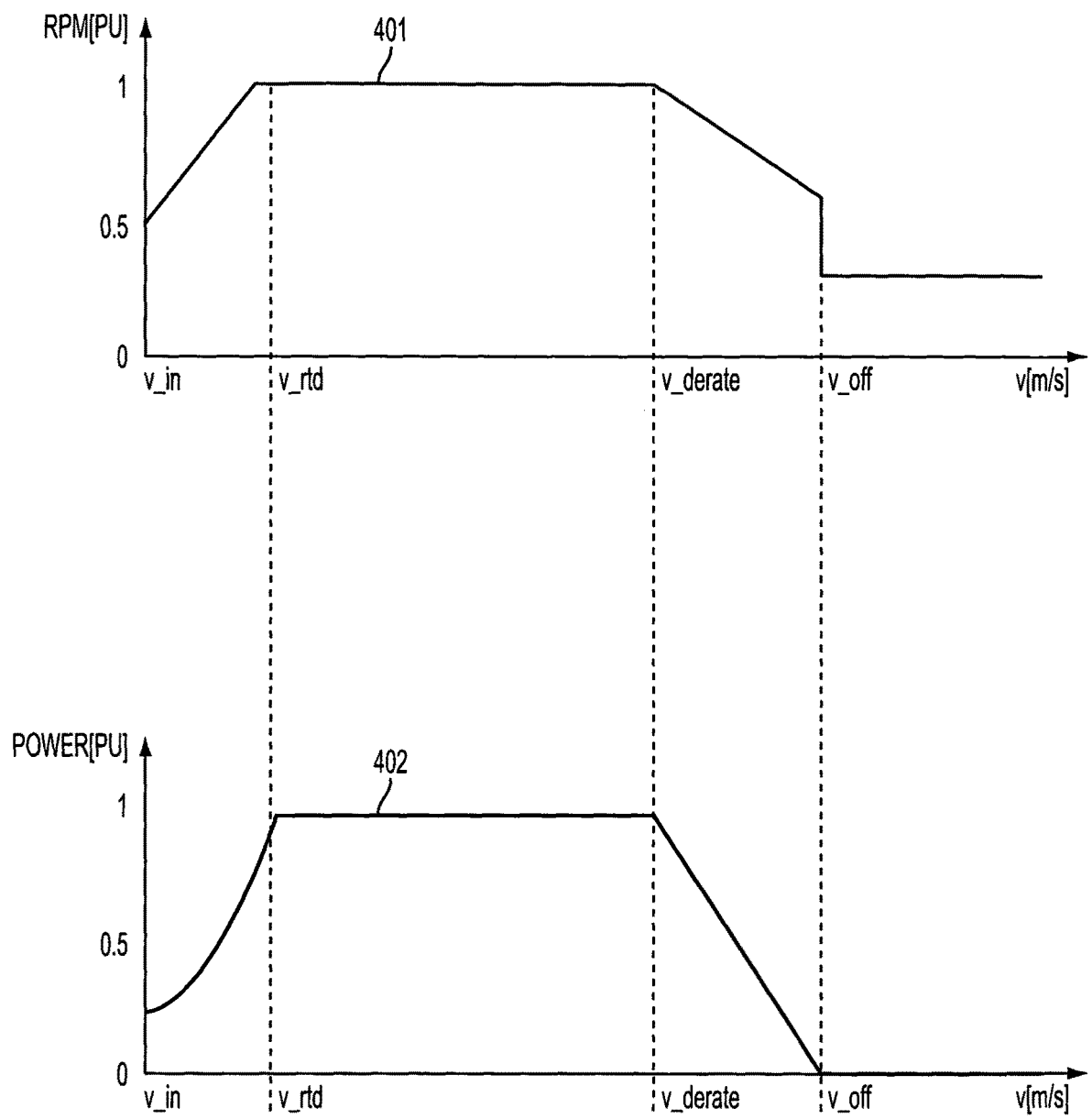
FIG. 4 illustrates control of rotation speed of the rotor dependent on wind speed and generated power dependent on the wind speed.

FIG. 4 illustrates how the rotational speed 401 of the rotor 5 is controlled dependent on wind speed data provided by input 902 and how the generated power 402 varies with the wind speed. At wind speeds between v_in and v_rtd the wind turbine is operated in a partial load mode, at wind speeds between v_rtd and v_derate the wind turbine is operated in a full load mode and at wind speeds between v_derate and v_off the wind turbine is operated in a de-rate mode. When the wind speed increases to v_off the wind turbine is operated in the idling mode according to embodiments of this invention wherein the rotor speed is reduced and power production from the generator is zero.

Referring to FIG. 2, based on input 905 from the acceleration sensor 10, the controller detects a longitudinal tower oscillation, and provides, with a longitudinal damper unit 906, based on the input 905, a collective pitch reference offset 907 which is added to the collective pitch reference 904. With the collective pitch reference offset 907 the pitch angles of each of the rotor blades are controlled 908, 909, 910 so as to produce aerodynamic forces counteracting the detected longitudinal tower oscillation.

For lateral oscillation, based on input 911 from the acceleration sensor 10, the controller detects a lateral tower oscillation, and provides, with a lateral damper unit 912, based on the input 911, an individual cyclic pitch reference offset 913, 914, 915 for each blade, which is added to the collective pitch reference 904. The cyclic effect can be obtained using a function of the current position of the rotor (azimuth position). With the cyclic pitch reference offset 913, 914, 915 the pitch angles of each of the rotor blades are controlled 908, 909, 910 so as to produce aerodynamic forces counteracting the detected lateral tower oscillation.

The determination of the cyclic pitch reference offset 913, 914, 915 may be performed by integrating the acceleration signal from input 911 to obtain a velocity signal of the lateral tower oscillation. The velocity signal may be multiplied by a feedback gain to obtain a modulation signal. The modulation signal is phase shifted, e.g. multiplied with minus one, in order to create a damping signal which can be used for creating forces via individual pitch actuation for counteracting the lateral tower oscillation. The cyclic pitch reference offsets 913, 914, 915 can be obtained from the damping signal by multiplying the damping signal with a sinusoidal function for each of the offsets. The sinusoidal functions are in the form $\sin(\omega t + \phi i)$, where $\omega$ is the rotation frequency of the rotor and $\phi i$ represents an angular position of the blade i. Accordingly, for a rotor with three blades, three cyclic pitch reference offsets 913, 914, 915 are determined where, as an example, $\phi i=[0, 2\pi/3, -2\pi/3]$ for i=1,2,3.

The determination of the collective pitch reference offset 907 may be performed similarly by integrating the acceleration signal from input 905 to obtain a velocity signal of the longitudinal tower oscillation. The velocity signal may be multiplied by a feedback gain to obtain a modulation signal. The modulation signal is phase shifted, e.g. multiplied with minus one, in order to create a damping signal which can be used for creating forces via collective pitch actuation for counteracting the longitudinal tower oscillation.

In case a combination of longitudinal and lateral oscillations are detected, the collective pitch reference offset 907 from the longitudinal damper unit 906 is added to the cyclic pitch reference offsets 913, 914, 915 from the lateral damper unit 912.

Figure 5:
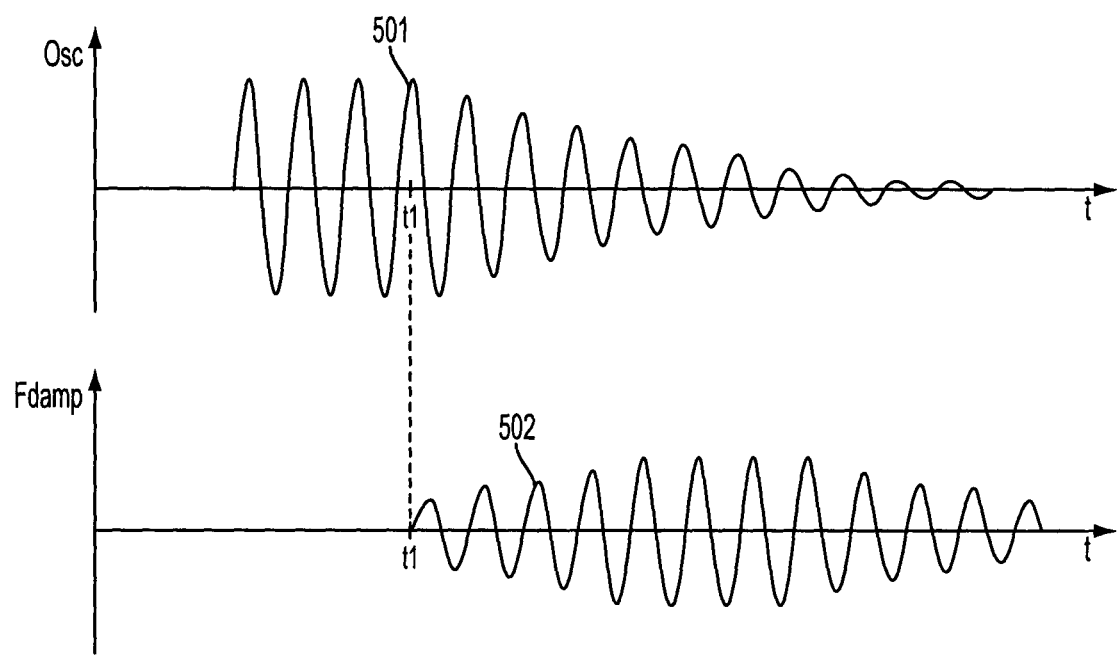
FIG. 5 illustrates tower oscillations during an idling power producing situation which are damped by an oscillating damping force.

FIG. 5 shows tower oscillations 501 corresponding to a measurement signal from an acceleration sensor 10 during an idling power producing situation. The tower oscillations may be in the form of longitudinal oscillations, lateral oscillations or a combination thereof. Initially, up to time t1, the tower oscillations are not damped actively by the damper units 906, 912. After t1 one or both of the damper units starts generating pitch reference offsets 907, 913, 914, 915. Due to the phase of the pitch reference offsets, the pitch action generates an oscillating damping force 502 which is in phase with the velocity signal (multiplied by minus one) of the tower oscillations and, therefore, causes damping of the tower oscillations. The amplitude of the damping force oscillations 502 and, thereby, the amplitude of the pitch reference offset oscillations may vary, e.g. as shown with an initial increase.

The damper units 906, 912 may be configured as feedback damper units which determines the pitch reference offsets 907, 913, 914, 915 as a function of the difference between the oscillation amplitudes provided via input 905,911 and a reference amplitude, e.g. zero, which represents the desired maximum tower oscillation amplitude. Accordingly, as the measured oscillation amplitude approaches the reference amplitude, the oscillating damping force 502 decreases as illustrated by the portion of the damping force 502 with decreasing amplitude.

Referring to FIG. 1, the power to the pitch adjustment system for controlling the pitch angle can be received from the utility grid, if this is available, or from an auxiliary power source 11. This auxiliary power source can be of any suitable kind, e.g. an electric power storage unit with batteries, or a backup diesel generator unit.

What is claimed is:

1. A method for operating a horizontal axis wind turbine, the wind turbine comprising a tower and a rotor with at least one rotor blade, the rotor being connected to the tower and being adapted to drive a generator connected to a utility grid, wherein a pitch angle of each rotor blade is adjustable, the method comprising:
   detecting, when the wind turbine is in an idling power producing situation in relation to the utility grid, a tower oscillation; and
   individually and cyclically controlling, when the wind turbine is in the idling power producing situation, the pitch angle of the at least one rotor blade according to a sinusoidal function so as to produce active damping with aerodynamic forces counteracting the detected tower oscillation, wherein the sinusoidal function is based on time, on an angular position of the at least one rotor blade in a plane of the rotor, and on a rotation frequency of the rotor.

2. The method according to claim 1, further comprising detecting that the wind turbine is in an idling power producing situation in relation to the utility grid.

3. The method according to claim 1, further comprising controlling the wind turbine so as to be in an idling power producing situation in relation to the utility grid.

4. The method according to claim 3, wherein controlling the wind turbine so as to be in an idling power producing situation comprises keeping each blade in a substantially feathered position.

5. The method according to claim 3, wherein controlling the wind turbine so as to be in the idling power producing situation comprises controlling the rotation speed of the rotor by adjusting the pitch angle of the at least one rotor blade.

6. The method according to claim 5, wherein the rotation speed of the rotor is controlled to be within a range from 10 to 25 percent of the nominal rotation speed of the rotor.

7. The method according to claim 1, wherein the wind turbine being in an idling power producing situation in relation to the utility grid includes keeping each blade in a substantially feathered position.

8. The method according to claim 7, wherein keeping each blade in a substantially feathered position includes keeping each blade feathered out into the wind and the pitch angle of each blade at least 70 degrees with reference to a zero degree reference blade position in which a reference chord of the blade is parallel to the rotor plane.

9. The method according to claim 7, wherein keeping each blade in a substantially feathered position includes keeping each blade feathered out into the wind and the pitch angle of each blade at least 80 degrees with reference to a zero degree reference blade position in which a reference chord of the blade is parallel to the rotor plane.

10. The method according to claim 7, wherein keeping each blade in a substantially feathered position includes keeping each blade feathered out into the wind and the pitch angle of each blade at least 86 degrees with reference to a zero degree reference blade position in which a reference chord of the blade is parallel to the rotor plane.

11. The method according to claim 1, wherein detecting the tower oscillation comprises detecting an acceleration of the tower.

12. The method according to claim 1, wherein detecting the tower oscillation comprises detecting a longitudinal tower oscillation, and wherein controlling the pitch angle of the at least one rotor blade comprises controlling the pitch angle of the at least one rotor blade so as to produce aerodynamic forces counteracting the detected longitudinal tower oscillation.

13. The method according to claim 1, wherein detecting the tower oscillation comprises detecting a lateral tower oscillation, and wherein controlling the pitch angle of the at least one rotor blade comprises controlling the pitch angle of the at least one rotor blade so as to produce aerodynamic forces counteracting the detected lateral tower oscillation.

14. The method according to claim 1, wherein the pitch angle of each rotor blade is adjusted by a pitch adjustment system based on a collective pitch reference and input from an acceleration sensor, wherein power to the pitch adjustment system for controlling the pitch angle is received from the utility grid.

15. The method according to claim 1, wherein the pitch angle of each rotor blade is adjusted by a pitch adjustment system based on a collective pitch reference and input from an acceleration sensor, wherein power to the pitch adjustment system for controlling the pitch angle is received from an auxiliary power source.

16. A wind turbine comprising:
a tower comprising a rotor having a plurality of rotor blades disposed around a hub at unique angular positions, the rotor connected to the tower and adapted to drive a generator connected to a utility grid, wherein a pitch angle of each rotor blade of the plurality of rotor blades is adjustable; and
a controller configured to detect the wind turbine in an idling power producing situation in relation to the utility grid, the controller further configured to detect a tower oscillation,
wherein the controller is configured to actively counteract the detected tower oscillation by cyclically adjusting the pitch angle of at least one rotor blade of the plurality of rotor blades according to a sinusoidal function based on time, on an angular position of the at least one rotor blade in a plane of the rotor, and on a rotation frequency of the rotor in response to the detected tower oscillation while in the idling power producing situation.

17. The wind turbine according to claim 16, wherein the detection of the tower oscillation comprises detecting a longitudinal tower oscillation.

18. The wind turbine according to claim 17, wherein the detection of the tower oscillation further comprises detecting a lateral tower oscillation, and wherein adjusting the pitch angle further comprises adjusting at least one of the plurality of rotor blades in response to the lateral tower oscillation.

19. A wind turbine tower controller comprising:
a speed control unit that generates a static idling pitch reference based on a rotor speed reference and a measured rotor speed, wherein the speed control unit is configured as a feedback controller that determines the static idling pitch reference, based on a difference between a received rotor speed reference and a measured rotor speed;
a longitudinal damper unit that produces a collective pitch reference offset based on an input from a tower longitudinal acceleration sensor; and
a lateral damper unit that produces a plurality of individual cyclic pitch reference offsets based on an input from a tower lateral acceleration sensor;
wherein both the static idling pitch reference and the collective pitch reference offset are added to at least one of the plurality of individual cyclic pitch reference offsets based on a sinusoidal function of time, of an angular position of at least one rotor blade in a plane of the rotor, and of a rotation frequency of the rotor to generate an active pitch angle dampening control applied to the at least one rotor blade of the wind turbine while the wind turbine is determined to be in an idling power producing situation in relation to a utility grid.

20. The wind turbine tower controller according to claim 19, wherein the speed controller is adapted to provide a generator torque reference for a generator, and wherein the determination of the wind turbine to be in the idling power producing situation comprises determining that the generator torque reference is zero, and the static idling pitch reference is constant.

* * * * *